Sept. 28, 1954 R. SARDESON 2,690,327
APPARATUS FOR HEATING AND COOLING LIQUIDS
Filed July 1, 1949 5 Sheets-Sheet 2

INVENTOR
ROBERT SARDESON
BY Chas. C. Reif.
ATTORNEY.

Sept. 28, 1954  R. SARDESON  2,690,327
APPARATUS FOR HEATING AND COOLING LIQUIDS
Filed July 1, 1949  5 Sheets-Sheet 3

INVENTOR
ROBERT SARDESON
By Chas. C. Reif
ATTORNEY

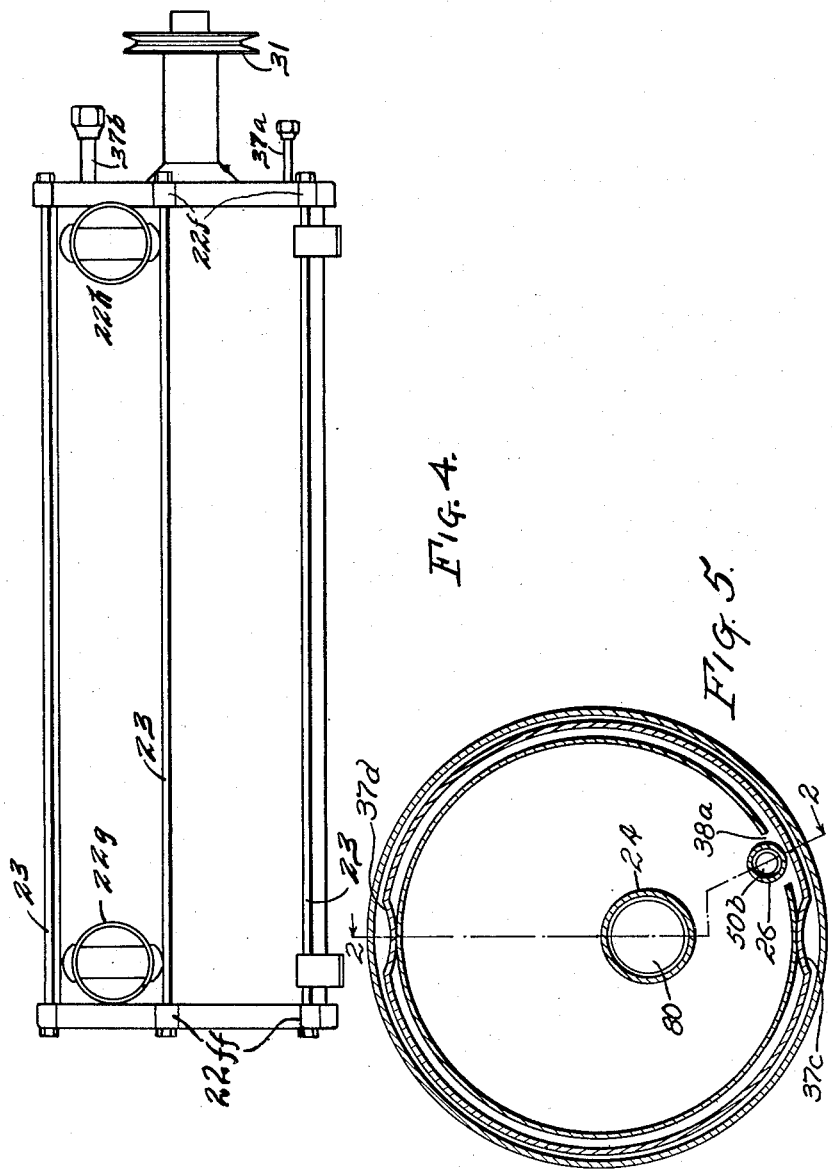

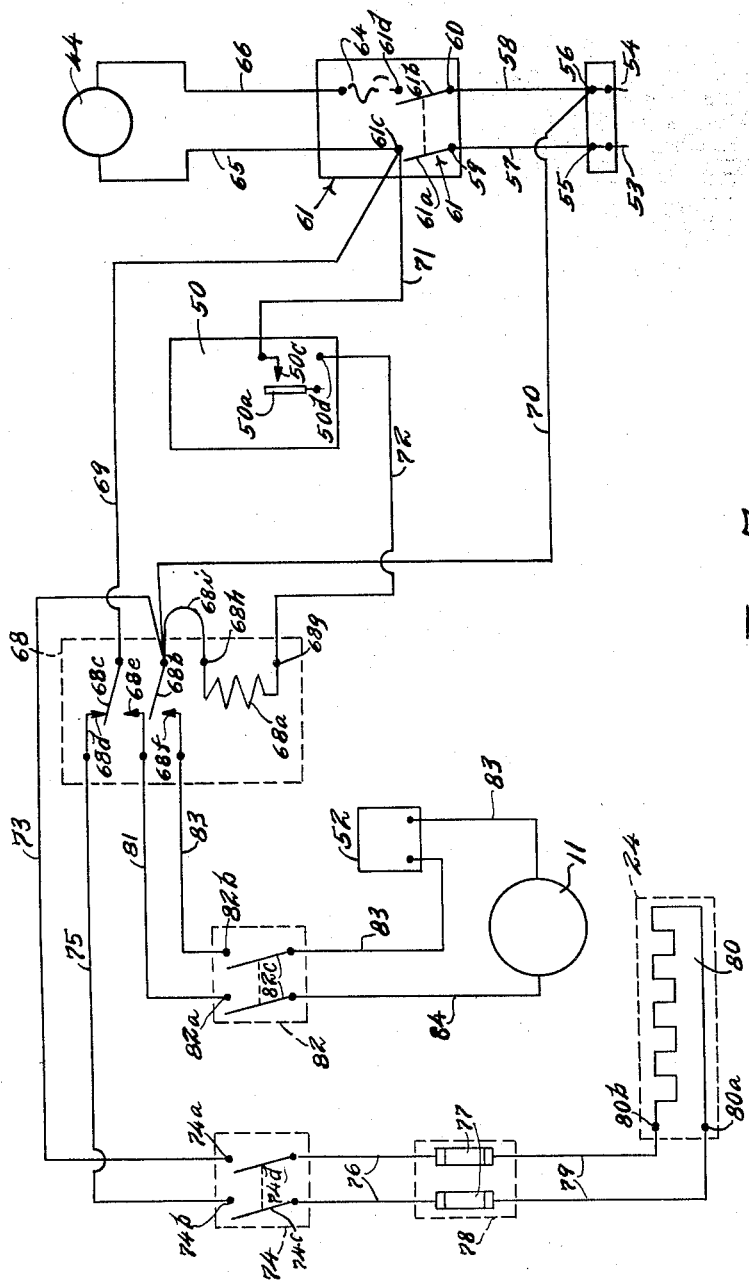

Patented Sept. 28, 1954

2,690,327

UNITED STATES PATENT OFFICE 2,690,327

APPARATUS FOR HEATING AND COOLING LIQUIDS

Robert Sardeson, Minneapolis, Minn., assignor to Pako Corporation, Minneapolis, Minn., a corporation of Delaware Application July 1, 1949, Serial No. 102,522

1 Claim. (Cl. 257—10)

This invention relates to a temperature controlling device for controlling the temperature of liquids used in industrial processing either by the direct control of the media or by control of fluid in a jacket surrounding another container.

Control of industrial fluid temperatures in the past has been accomplished by the use of a multiplicity of devices, one device being used for each function desired. Abstraction of heat has been accomplished by refrigeration means, while addition of heat has been accomplished by a separate heating means. Each of these devices to be automatic in function has required its own thermostatic control and when circulation has been desired it has been necessary to provide a pumping means of some sort. The installation of each of these pieces of apparatus has required the services of a specially trained technician and the resultant cost of installation has frequently exceeded the purchase price of the apparatus.

It is an object of this invention to provide a simple and self-contained unit for circulating a regulating liquid to maintain the desired temperature in the medium to be regulated.

It is also an object of this invention to provide a device for controlling the temperature of liquids comprising a simple and very compact unit, with comparatively few parts which can be assembled in the factory and transported to the place of use.

It is another object of the invention to provide a simple and compact unit including a casing for containing liquid, which liquid is conveyed to the medium to be regulated, a refrigerating unit for supplying a refrigerant, a container through which said refrigerant is circulated, a heating element and control means for selectively operating either said refrigerating unit or heating element.

It is also an object of this invention to provide a temperature regulating device comprising a refrigerating unit for supplying and circulating a refrigerant, a casing for containing liquid having inlet and outlet conduits through which the liquid is conveyed to the medium to be regulated, a container in said casing through which said refrigerant is circulated, a heating element in said casing, means for circulating said liquid and a control means including a single thermostat for selectively operating either said refrigerating unit or said heating means.

It is another object of the invention to provide a container through which refrigerant is circulated which has its walls closely spaced so that a passage of very small transverse dimension and comparatively great length is formed, through which the refrigerant passes at a high velocity and with a scrubbing action, thereby effecting a high rate of heat transfer between the refrigerant and the walls of the container.

Another object of the invention is to have inner and outer walls closely spaced from the refrigerant container whereby a passage of very small transverse dimension and comparatively great length is formed, through which the fluid being tempered passes at high velocity and with a scrubbing action, thereby effecting a high rate of heat transfer between the fluid being tempered and the walls of the refrigerant container.

It is a further object of the invention to provide a novel device in which the refrigerant and the fluid to be cooled are each transported as relatively thin films and at relatively high velocity adjacent opposite sides of a metal wall effecting thereby a high rate of heat transfer and an economy in the amount of material used in the construction of the device.

Other objects of the invention comprise a novel structure of said casing above referred to, a novel construction of the liquids circulating elements, and a novel structure in the control means used.

These and other objects and advantages of the invention will be fully set forth in the following description made in connection with the accompanying drawings in which like reference characters refer to similar parts throughout the several views and in which:

Fig. 4 is a plan view of the casing shown in Fig. 2;

Fig. 5 is a vertical section taken on line 5—5 of Fig. 2, as indicated by the arrows, with the outer casing omitted;

Fig. 7 is a view showing the wiring diagram for the device.

Figure 1:
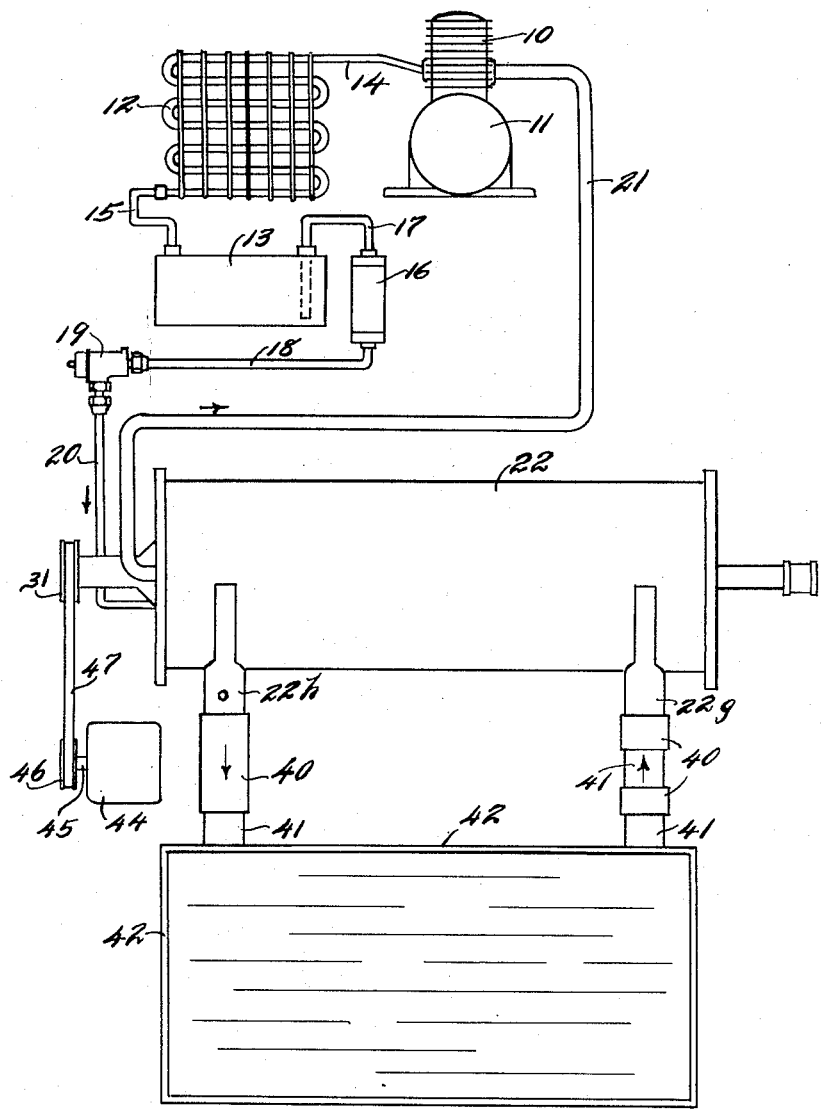
Fig. 1 is a somewhat diagrammatic view of the device.

Referring to the drawings a device is shown comprising a refrigerating unit, which unit includes a compressor 10 driven by a suitable motor 11, a radiator or condensing coil 12 and a receiving chamber or casing 13. Compressor 10 is connected to the condenser 12 by the conduit or pipe 14 and said condenser 12 is connected to chamber 13 by a suitable conduit or pipe 15. A dehydrating device 16 is connected to chamber 13 by a suitable pipe or conduit 17 which latter extends to adjacent the bottom of chamber 13. Member 16 is connected by a suitable pipe or conduit 18 to an expansion valve 19 from which leads a pipe or conduit 20. A conduit 21 is connected to compressor 10 and forms the inlet conduit thereof.

A casing 22 is provided and while this casing could take various forms, in the embodiment of the invention illustrated it is shown as a substantially cylindrical casing, the same having a central portion 22a illustrated as made of sheet material. This material will preferably be a suitable metal, such as stainless steel, which is not subject to corrosion by common liquids. Said casing is closed at one end with an end member or plate 22b. In practice this plate has been made of cast iron which is relatively subject to corrosion. Disposed between the plate 22b and the end edges of portion 22a is a sheet 22d of suitable yielding or rubber-like composition. This sheet may be made of a suitable rubber composition. Sheet 22d is provided with an inwardly extending portion or lip 22e which extends along the inner side of portion 22a. Said casing is closed at its other end by a corrosion resistant plate 22i which rests upon a gasket 22c having a lip 22ee extending along the inner side of portion 22a. Plate 22i is held in engagement with the gasket 22c and the cylindrical casing 22a by an annular member 22f. A second casing 24 extends inwardly from plate 22i into casing 22. A third casing 26 extends from plate 22i inwardly into casing 22. Casings 24 and 26 are secured to plate 22i and may be integral therewith. Plate 22b and ring 22f are drawn and held against the gasket 22c and sheet 22d and the latter against portion 22a by a plurality of bolts 23 extending between plate 22b and ring 22f and disposed in circumferentially spaced lugs 22ff on said plates. (See Fig. 4.) Casing 22 is provided with an inlet conduit 22g and an outlet conduit 22h. While in Fig. 2 for convenience these are shown extending at one side of said casing, in practice they are disposed at the top side of casing 22, as indicated in Fig. 4.

Figure 2:
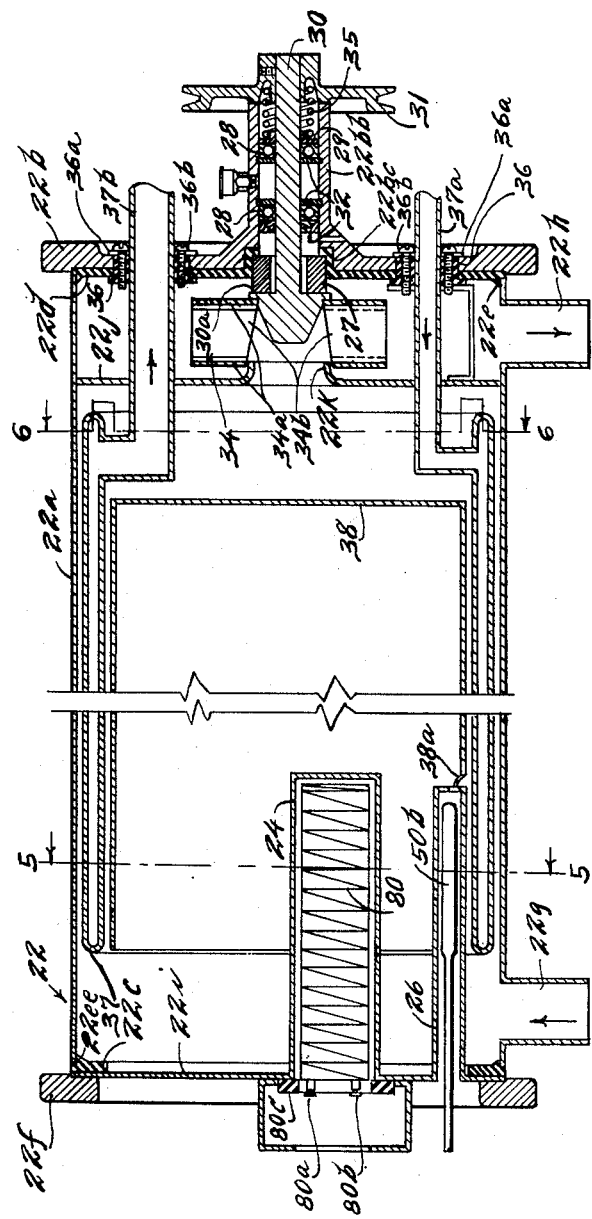
Fig. 2 is a central longitudinal horizontal section taken substantially on line 2—2 of Fig. 5, as indicated by the arrows.

One end plate 22b, namely the one shown at the right in Fig. 2, has a hub 22bb extending outwardly therefrom. Said hub is provided with a central bore, the inner end of which is counterbored to form a recess 22bc. Sheet 22d extends along the wall of recess 22bc and along both the cylindrical and vertical portions of said wall. A sealing block 27 is disposed within the portion of sheet 22d disposed in the recess 22bc. Spaced bearings 28 are disposed in hub 22bb and while different types of bearings might be used, said bearings are illustrated as ball bearings. A shaft 30 is journaled in bearings 28 to the outer end of which is secured a pulley 31 having a central hub which engages the outer end of hub 22bb. Pulley 31 is shown as having a groove in its periphery adapted to accommodate a V-belt. Sealing washers 32 of any suitable type surround shaft 30 adjacent bearings 28. Block 27, which in practice has been a carbon block, has a bore greater than the diameter of shaft 30. The inner end of shaft 30 has secured thereto an impeller or pump 34. This impeller is of simple form comprising spaced circular side plates 34a and blades or vanes 34b having flanges at their sides which are welded to plates 34a. Impeller 34 has an inlet opening at its central and inner portion and casing 22 is provided with plate 22j which extends from portion 22a and has a short hub or spout 22k extending close to the central portion of impeller 34. Shaft 30 is provided with a vertical or shoulder surface 30a which engages the inner side of block 27. A compression coiled spring 35 is disposed in hub 22bb engaging a plate 29 seated against the outer bearing 28 at one end and at its other end engaging the hub of pulley 31. Spring 35 thus acts to hold surface 30a against the inner side of block 27.

Figure 6:
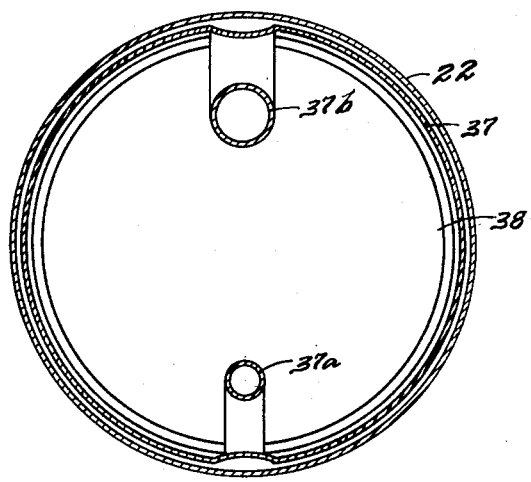
Fig. 6 is a vertical section taken on line 6—6 of Fig. 2, as indicated by the arrows.
Figure 3:
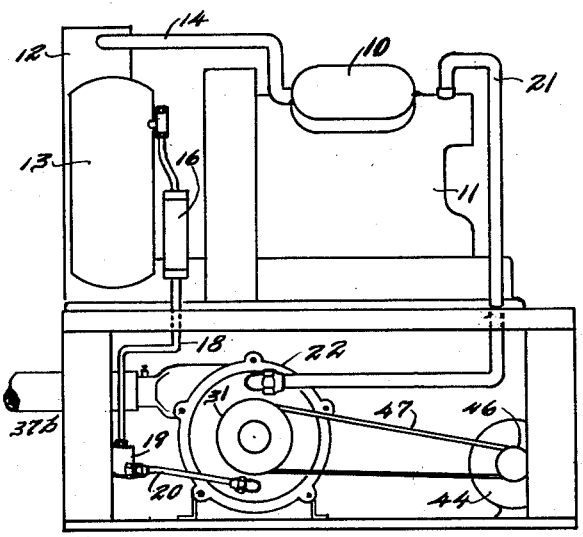
Fig. 3 is a view in end elevation as seen from the right of Fig. 2; showing the actual location of the refrigerating unit.

Disposed within casing 22 is a container 37. While this container might take various forms, in the embodiment of the invention illustrated it is shown as being of cylindrical and annular form. Casing 37 is closed at its inner end or its left hand end, as shown in Fig. 2, and at its other end is provided with an inlet conduit 37a which extends through end plate 22b and sheet 22d and which is connected with conduit 20. Casing 37 is provided with an outlet conduit 37b at the same end thereof. Conduit 37a and conduit 37b extend through end plate 22b and sheet 22d and will be connected with conduit 21. Sealing bushings 36 of non-corrosive material surround conduits 37a and 37b in end plate 22b and are held in place by plates 36a and bolts 36b. The outer wall of container 37, as shown in Fig. 2, is disposed in very close proximity to the inner wall of portion 22a. A passage of very small transverse dimension and also of comparatively great length is thus formed between said walls. A drum 38 is disposed within container 37, said drum having a closed end at its end adjacent impeller 34, the other end of said drum being open. It will be noted, as shown in Fig. 2, that the outer wall of drum 38 is disposed in close proximity to the inner wall of container 37 so that a passage of very small transverse dimension and also of comparatively great length is formed between the periphery of drum 38 and container 37. As shown in Figs. 2 and 5, the drum 38 has a portion cut away at 38a to accommodate casing 26 so that the latter may be in closer proximity to container 37. Container 37 has pressed-in portions 37c and 37d at the points where the inlet conduit 37a and the outlet conduit 37b are connected thereto, as shown in Figs. 5 and 6.

As shown in Fig. 1, the conduits 22g and 22h are connected by couplings 40 to conduits 41 which communicate with a tank 42 in which one or more receptacles containing liquids to be tempered will be disposed. In Fig. 1 an electric motor 44 is shown having a driving or armature shaft 45 to which is secured a pulley 46. A belt 47 runs over pulley 46 and over pulley 31.

A wiring diagram for the device is shown in Fig. 7, which includes certain parts used. A thermostat 50 is shown having a swinging armature 50a which is adapted to move to engage and disengage a contact 50c. This thermostat has a bulb portion 50b which is disposed in casing 26, as shown in Fig. 2. The thermostat is of the well known bellows type and operates when the temperature of the liquid in bulb 50b reaches a certain temperature to move armature 50a to disengage the same from contact 50c. This is the low temperature actuation of said thermostat. When the fluid in bulb 50b attains a certain higher temperature, thermostat 50 acts to move armature 50a to engage contact 50c. In the wiring diagram the motor 11 for the compressor 10 is shown and the motor 44 which drives pulleys 46 and 31 and thus the pump or impeller 34 is shown. A cutout pressure switch 52 is shown for the compressor which merely acts to cut off motor 11 if the pressure is too high or too low. The electrical power lines are shown as the conductors 53 and 54 which are connected to the terminal or inlet posts 55 and 56 respectively. Conductors 57 and 58 extend from posts 55 and 56 respectively to the terminals 59 and 60 respectively of a manually closable switch 61. This switch has poles 61a and 61b which are adapted to engage respectively the contacts 61c and 61d when the switch 61 is closed and the device is put in operation. A cutout overload device 64 is provided which will operate to automatically open switch 61 when there is too much current to the pump motor 44. A relay 68 is provided having an actuating coil 68a and movable armatures 68b and 68c adapted to cooperate with contacts 68d, 68e and 68f. A conductor 69 extends from armature 68c to the contact 61c of switch 61. Another conductor 70 extends from terminal contact 56 to armature 68b. A conductor 71 extends from contact 61c of switch 61 to the contact 50c of thermostat 50. A conductor 72 extends from a contact 50d of thermostat 50 to a contact 68g of relay 68 to which one end of coil 68a is connected. The other end of coil 68a is connected to a contact 68h and a conductor 68i connects contact 68h to armature 68b. A conductor 73 extends from armature 68b to a contact 74a of a manually operable switch 74. A conductor 75 extends from contact 68d of relay 68 to another contact 74b of switch 74. Switch 74 comprises poles 74c and 74d from which conductors 76 extend through fuses 77 in a fuse box 78 to conductors 79 which are connected to the terminals 80a and 80b of a heating element 80, which heating element is disposed in casing 24 shown in Fig. 2. Terminals 80a and 80b are disposed in an insulating ring 80c. A conductor 81 extends from contact 68e of relay 68 to a contact 82a of a manually operable switch 82. Another conductor 83 extends from contact 68f of relay 68 to a contact 82b of switch 82. Switch 82 has blades or poles 82c adapted to respectively engage and disengage contacts 82a and 82b. A conductor 83 extends from one pole 82c through the pressure switch 52 and to the motor 11 of the compressor. Another conductor 84 extends from the other pole 82c to the motor 11.

In operating, assuming that the device is in inoperative position and the liquids disposed in suitable tanks in casing 42 are to be regulated, the thermostat 68 will be adjusted so that armature 50a will open at a certain minimum temperature and will close at a certain maximum temperature. Let it be assumed that the liquid is at a temperature causing thermostat 50 to move armature 50a to disengage contact 50c, as shown in Fig. 7. The operator will now manually close switch 61. This will start motor 44 and the pump or propeller 34 will be operated. It will be understood that casing 22 contains liquid, such as water, which liquid extends through the conduits 22g and 22h and to the casing 42. This liquid is circulated by pump 34 out through conduit 22h to conduit 41, through casing 42, out through the other conduit 41, as indicated by the arrows in Fig. 1, through conduit 22g, back into casing 22, as indicated by the arrows in Fig. 2. Current will now pass from line 53 through conductor 57, switch 61, conductor 69, armature 68c and contact 68d, conductor 75, through switch 74 which is now closed, through one conductor 79 to the heating element 80, back through the other conductor 79, conductor 76 through switch 74 to conductor 73, to armature 68b and from said armature through conductor 70 to the inlet line 54. The heating element 80 is now operated and the liquid or water in casing 22 will be heated and this will be circulated into casing 42 so that the liquid will be heated. This will continue until the said water and liquid are heated to the desired point. When this point is reached, thermostat 50 will act to swing armature 50a to engage contact 50c. Current will now pass from inlet line 53 through conductor 57, pole 61a of switch 61, through conductor 71 to contact 50c, through armature 50a to contact 50d, through conductor 72 to contact 68g, through the coil 68a of relay 68 to terminal 68h, through conductor 68i to armature 68b and then through conductor 70 to inlet conductor 54. When this circuit is closed, coil 68a will be energized and armature 68b will be moved into engagement with contact 68f and armature 68c will be moved into engagement with contact 68e and out of engagement with contact 68d. Current will now flow from inlet line 53 through conductor 57, switch 61, conductor 69, armature 68c, contact 68e, conductor 81, through switch 82 which will now be closed, through conductor 84 to motor 11, out through conductor 83, through switch 52 and conductor 83, through switch 82 to conductor 83, contact 68f, armature 68b and conductor 70 to line 54. Compressor motor 11 will now be started. It will also be noted that the line to the heating element 80 has been opened, which opening occurred when armature 68c moved out of engagement with contact 68d. The motor 11 now operates the compressor 10 and the refrigerating fluid such as "Freon" is compressed, passed through condensor 12 so as to be liquified, discharged into receiver 13 from which it passes through the dehydrator 16 and conduit 18 to the expansion valve 19. Here the liquid is expanded and passes as a mixture of gas and liquid through conduit 20 to inlet conduit 37a, then through the annular container 37 and out through outlet conduit 37b, as indicated by the arrows in Fig. 2. The "Freon" then passes through conduit 21 to compressor 10. The liquid being circulated by pump 34 passes between the outer wall of casing 37 and the inner wall of casing 22, as above described, and thus through a passage very small in transverse dimension. A very efficient cooling effect is thus had on the liquid. This cooling effect is also had as the liquid passes through the passage between drum 38 and container 37, which passage is also very small in transverse dimension. The thermostat bulb 50b, as shown in Fig. 2, is disposed close to container 37 and is between one side thereof and the casing 24 which contains the heating element 80.

While the above description of the operation of the invention details an operating cycle in which the sources of heat and refrigeration are in use alternately, the invention may be used equally well with only the refrigeration or the heat source in operating status. Such a condition is obtained for the refrigeration by closing switches 61 and 82 whereas the heat source alone is placed in operation by closing switches 61 and 74 only.

When the ambient temperature is higher than the desired liquid temperature, the refrigeration circuit alone will normally be selected. If the ambient temperature is lower than the desired liquid temperature the heating circuit will normally be selected. If the ambient temperature is apt to vary above and below the desired liquid temperature, both the heating circuit and the refrigeration circuit may be used.

It will be noted that if the pump motor 44 should be overloaded, switch 61 will be opened and current will be cut off from the whole device. There will thus be no cooling or heating effect on the liquid in casing 22 should there be no circulation.

From the above description it will be seen that I have provided a very compact and efficient temperature regulating device. It has long been a difficult problem to maintain liquids at the desired temperature. Cumbersome arrangements have been proposed including several thermostats but these have been unsatisfactory. One salient feature of the present device is that it controls the heating or cooling with only one thermostat. It has been found that if two thermostats are used when the liquid is at a temperature near the regulating temperature, the thermostats are apt to oppose each other and the desired results cannot be attained. With the present arrangement the one thermostat controls the operation of either the cooling or heating element and the temperature of the circulating liquid can thus be very nicely controlled. The device has been installed in various commercial establishments and has proved to be very successful and efficient. The temperature of the liquids can be maintained at a temperature which will not vary more than one degree. The unit is very compact and can be easily and quickly installed.

It will of course be understood that various changes may be made in the form, details, arrangement and proportions of the parts, without departing from the scope of applicant' invention, which generally stated, consists in a device capable of carrying out the objects above set forth, in the parts and combinations of parts disclosed and defined in the appended claim.

What is claimed is:

A device for regulating the temperature of a body of liquid having in combination, a container for liquid, said container being of cylindrical form and having end walls, a second container for liquid in said container, said second container having cylindrical walls spaced a small distance apart and connected at one end so that said second container is of annular form, spaced inlet and outlet conduits for said second container extending through one end wall of said first mentioned container, the outer wall of said second container being spaced a short distance from the wall of said first mentioned container, a third cylindrical member disposed within said second container, the same having a closed end adjacent the end of said second container from which said conduits extend and being open at its other end, the wall of said third member being spaced a short distance from the inner wall of said second container, said third member having a diameter many times greater than either of said distances, inlet and outlet conduits extending from said first mentioned container adjacent and substantially parallel to the ends thereof respectively, said conduits being adapted to extend to the body of water to be heated, a heating device extending through the other end wall of said first mentioned container and into the open end of said third member and into the open end of said second container, means for circulating a cooling medium through said first mentioned conduits and said second container, means for circulating the liquid in said first mentioned container between the outer wall of said second container and the wall of said first container and between the inner wall of said second container and said third member, said means comprising a rotary vaned impeller adjacent said closed end of said third member, the axis of which is substantially coincident with the axis of said containers, said impeller having an inlet opening at the side nearest the closed end of said third member, and a partition extending across said first mentioned container having a central opening communicating with said inlet opening, said impeller having its discharge portion substantially alined with said outlet conduit.

References Cited in the file of this patent

UNITED STATES PATENTS

| Number | Name | Date |
| --- | --- | --- |
| 950,834 | Bonn | Mar. 1, 1910 |
| 1,180,534 | Pownall | Apr. 25, 1916 |
| 1,436,380 | Coen | Nov. 21, 1922 |
| 1,771,638 | Johnson | July 29, 1930 |
| 1,890,573 | Dubrovin | Dec. 13, 1932 |
| 1,896,953 | Hassell | Feb. 7, 1933 |
| 2,077,394 | Buenger | Apr. 20, 1937 |
| 2,122,228 | Goehler | June 28, 1938 |
| 2,232,998 | Cernohouz et al. | Feb. 25, 1941 |
| 2,302,253 | Reichel et al. | Nov. 17, 1942 |
| 2,343,147 | Katsulos | Feb. 29, 1944 |
| 2,372,079 | Gunter | Mar. 20, 1945 |
| 2,450,478 | Johnson | Oct. 5, 1948 |
| 2,471,538 | Oaks | May 31, 1949 |
| 2,489,049 | Root | Nov. 22, 1949 |